United States Patent [19]

Williams, Jr. et al.

[11] 4,026,186
[45] May 31, 1977

[54] SELF-DRILLING ONE-PIECE MASONRY ANCHOR

[75] Inventors: Elbert Eugene Williams, Jr., Wooddale; Richard John Ernst, Palatine, both of Ill.

[73] Assignee: Illinois Tool Works Inc., Chicago, Ill.

[22] Filed: Feb. 23, 1976

[21] Appl. No.: 660,595

[52] U.S. Cl. .................... 85/68; 85/72; 408/228
[51] Int. Cl.² .......................... E04B 1/48
[58] Field of Search ............ 85/68, 83, 82, 74, 75, 85/72; 408/228, 227, 229, 230, 226

[56] References Cited

UNITED STATES PATENTS

| | | | |
|---|---|---|---|
| 1,379,209 | 5/1921 | Phillips | 85/68 |
| 1,621,598 | 3/1927 | Phillips | 85/68 |
| 2,171,985 | 9/1939 | Mushet | 85/68 |
| 3,202,035 | 8/1965 | Rosselet | 85/68 |
| 3,411,398 | 11/1968 | Blakeley et al. | 85/72 |
| 3,467,209 | 9/1969 | Chromy | 85/68 X |
| 3,487,745 | 1/1970 | Brunelle | 85/68 |

FOREIGN PATENTS OR APPLICATIONS

| | | | |
|---|---|---|---|
| 280,834 | 12/1964 | Australia | 85/68 |
| 1,221,056 | 7/1966 | Germany | 85/68 |
| 2,106,107 | 8/1971 | Germany | 85/68 |
| 1,232,185 | 5/1971 | United Kingdom | 85/68 |

*Primary Examiner*—Ramon S. Britts
*Attorney, Agent, or Firm*—Thomas A. Buckman; Robert W. Beart

[57] ABSTRACT

An expansion anchor device for use in masonry structure which is capable of drilling a hole in the structure and being set without the necessity of removal of the device from the hole. A drill tip portion with a conical upper region is interconnected to a generally cylindrical sleeve portion through a frangible wall. Helical flute grooves are formed on the outer surface of the sleeve to permit exhaust of drilled material from the hole.

6 Claims, 5 Drawing Figures

SELF-DRILLING ONE-PIECE MASONRY ANCHOR

BACKGROUND OF THE INVENTION

Anchor devices for use in masonry structures such as concrete and more particularly of the pull-to-set or wedge variety typically are multi-operation devices. Typical prior art devices require a separate drill type member to form a bore into which the anchor is placed. In operation, the drill is removed in some manner and an anchor bolt assembly is positioned in the hole. It is not uncommon for prior art devices to utilize a drill member in some manner as a component of the anchor device. However, all of the prior art devices require the removal of the drill element after it has formed the bore so that a second or further member can be associated with the drill to form the anchor. For example, in one such prior art device the drill member is formed from a cylindrical sleeve with teeth formed at one end. In use, the sleeve forms a hole in the concrete by a rotary percussion hammer and the axial bore through the sleeve permits the exit of material. When the hole has been drilled to a predetermined depth, the sleeve is removed and a tapered plug is positioned in one end. This combination device is then inserted in the hole and expanded by an impact force to the other end of the device. Another attempt by the prior art to utilize the drill as a member of the anchor device utilizes the drill as a conical type expanded plug which may or may not be left in the hole. In either case, however, a separate sleeve member must be positioned over this device and expanded.

SUMMARY OF THE INVENTION

It is accordingly an object of the present invention to provide an anchor device for use in masonry which is capable of forming a bore in the support structure and being set without removal of the device from the bore formed.

A further object of the invention is to provide a one-piece anchor device which can be utilized with a rotary percussion driving device to form a hole and yet be set very easily.

Still a further object of the invention is the provision of a one-piece anchor device which is capable of drilling a hole and exhausting the material drilled externally of the device.

A particular advantage of the present invention is the capability of the device to be utilized with a rotary percussion hammer type apparatus wherein the percussion elements of the driving force are applied directly to the drill portion and the device is thereafter capable of fracturing to set when it has been drilled to a predetermined depth.

These and other objects of the invention are provided by the present invention which comprise a one-piece device having a drilling tip at one extremity and a sleeve member at the other extremity integrally connected by a frangible wall. The drill tip forms a predetermined diameter and a portion above this predetermined diameter is tapered inwardly to provide an area into which the comminuted material may flow as well as a surface over which the sleeve may be driven and expaned. The sleeve will further include a helical groove or channel extending from the frangible wall to the uppermost extremity of the sleeve to aid in the exiting of the material and will preferably be of the same hand as the direction of rotation of the drill. A further aspect of the invention is the use of an abutment surface at the uppermost extremity of the drill portion and located within the inner periphery of the sleeve so that an impact force may be applied directly to the drill during the drilling without subjecting the frangible wall to premature impact forces.

DESCRIPTION OF THE PREFERRED EMBODIMENTS

Figure 1:
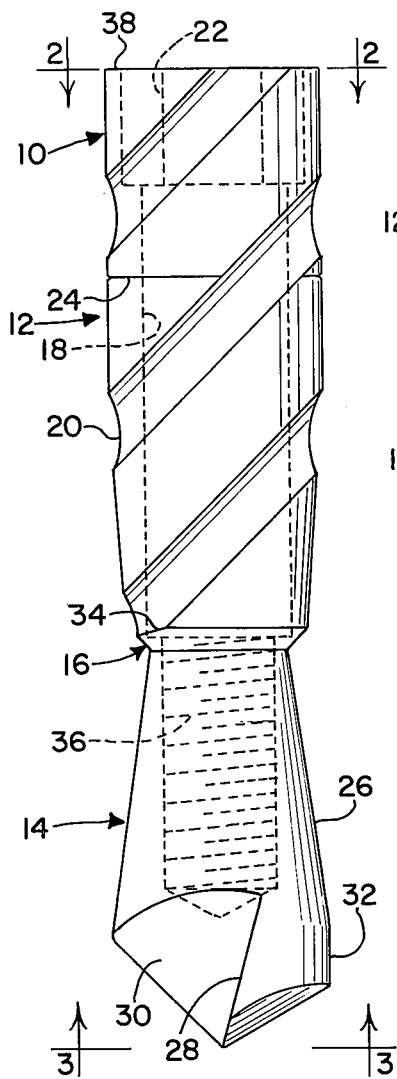
FIG. 1 is a side of a side elevational view of an anchor device embodying the invention.
Figure 2:
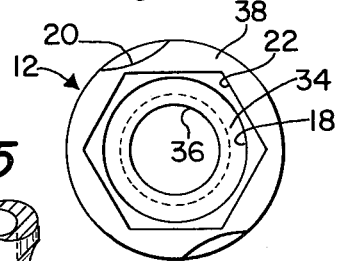
FIG. 2. is a view taken along the line 2—2 of FIG. 1.

Referring now to the drawing, one form of the invention is shown in FIGS. 1–4 wherein anchor device 10 basically consists of a drill portion integrally connected to a sleeve portion. The drill tip portion 14 is connected to a sleeve portion 12 by a frangible thin wall section 16. The sleeve has a bore 18 formed therein and the drill portion has a threaded bore 36 formed coaxial with the sleeve and its bore 18. The maximum diameter of the bore 18 will be somewhat greater than the diameter of the threaded bore 36 for a purpose to be set forth later herein.

The terminal extremity of the drill, at the cutting edges thereof, defines a diameter substantially equal to the diameter of a hole to be formed in the masonry structure drilled. In the form of the invention shown herein the drill tip consists of a pair of cutting edges 28 extending outwardly and upwardly from an apex. Each cutting edge 28 defines the terminal edge of one of a pair of intersecting surfaces which form material removing flutes 30. A generally conical surface 26 tapers inwardly from the diameter defined by the cutting edges 28 and provides an initial reservoir for comminuted material in addition to providing a wedging surface over which the sleeve 12 may be telescopically driven and expanded.

In operation, the device 10 may be imbedded in masonry with a rotary percussion hammer device typical of devices used to drive prior art concrete or masonry drills. Driving surfaces such as an internal hex 22 may be provided in the bore of the sleeve for accepting the forces from the rotary hammer device.

Figure 4:
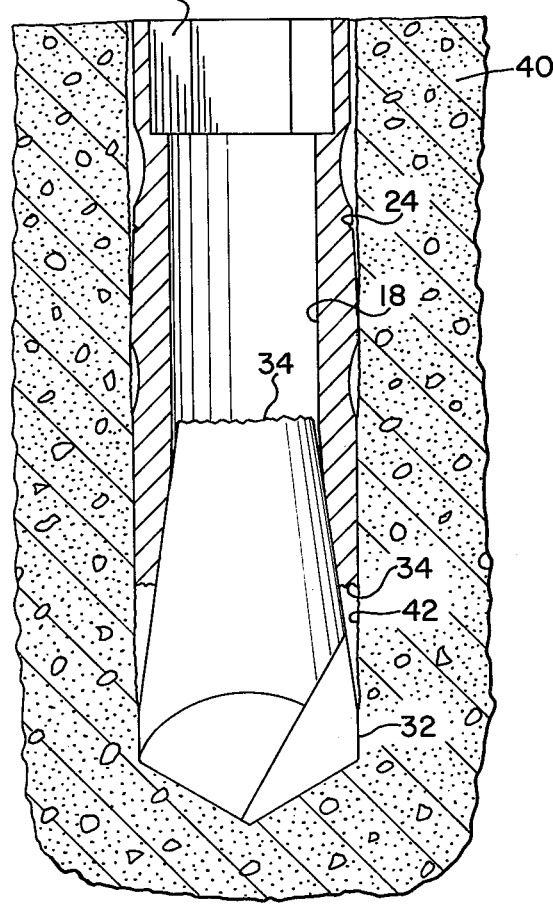
FIG. 4 is a cross-sectional view of the anchor device after it has drilled a hole in concrete and the sleeve wedged over the drill point.
Figure 3:
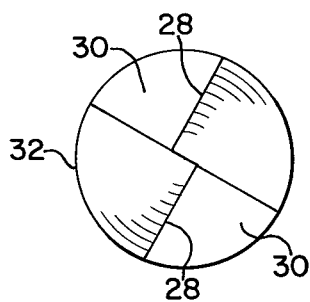
FIG. 3 is a view taken along the line 3—3 of FIG. 1.

A scribe line 24 may be positioned intermediate the extremities of the sleeve to indicate when the desired depth of drilling has been reached. The use of such a scribe line also carefully controls the initial wedging action of the sleeve over the drill. When the device 10 has been drilled to the desired depth, an impact force is delivered to an upper surface of the sleeve such as 38 wherein the frangible wall 34 interconnecting a drill to the sleeve fractures and allows the sleeve to telescope over the conical surface 26 such as shown in FIG. 4. The driving edge 38 may be positioned flush with the upper surface of the concrete structure 40 while the lowermost extremity of the sleeve will wedge against the walls 42 of the bore formed in the support structure with a controlled anchoring force. The predetermined scribe line will enable the individual to properly set the anchor with the upper surface of the sleeve flush with the workpiece using a minimum amount of impact force. A mating bolt may thereafter be inserted in the threaded bore 36 attaching a fixture to the support surface thereafter the axial forces tending to pull the tip upwardly in the hole will serve to enhance the locking or anchoring of the device in the bore.

Attention is directed to the outer surface of the device shown in FIG. 1 wherein a spiral flute 20 is shown to extend longitudinally from the frangible wall section 16 to the upper extremity of the sleeve. Such a flute is important to insure that the comminuted material is exited from the hole being drilled. It may also be advantageous to form the flute 20 so that the direction of the helix is in the direction of rotation of the drill tip during the rotary percussion application. The flute 20 may be positioned so that it begins directly adjacent the frangible wall section to provide an area where stress can be concentrated to facilitate splitting and expanding the sleeve as it is driven over the drill tip.

To facilitate the percussion and rotary drilling operation, a driving tool device can be utilized that applies the percussive impact forces directly to the drill point rather than through the frangible wall section. To accommodate such a driving tool device, the floor or base wall 34 of the sleeve is configured to accept direct impact blows from the extremity of a rod-like driving tool. A rod-like driving tool associated with this anchor device may also include a hexagon outer surface which is complementary to the internal hex 22 to provide the device with the required rotary action. Using such a method of installation, the device will not be prematurely fractured.

A generally cylindrical segment 32 may be formed immediately above the cutting edges and extending for a short distance thereabove to present surfaces generally parallel to the axis. These surfaces enable the drill to wear without decreasing the predetermined diameter. Since the device is intended to be used only once, it is therefore not necessary to design a drill tip with expanded cutting life or sharpening capabilities.

Figure 5:
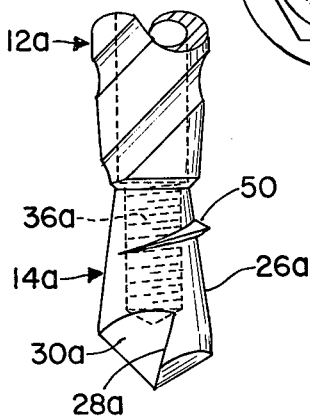
FIG. 5 is a partial side elevational view of an alternate embodiment of the invention.

To further facilitate the exiting of comminuted material from the hole in the workpiece, the drill tip portion may be provided with helical flute-like depressions or slight thread forms such as 50 shown in FIG. 5. If thread form 50 is used, they should not present a crest diameter greater than the diameter defined by cutting edges 28a. In fact, thread form 50 with a crest diameter substantially equal to the diameter of cutting edges 28a may serve to size the hole being drilled in addition to providing additional material removal means to the device. When the tip portion 14a has drilled to the desired depth, the sleeve portion 12a may be driven over the surface 26a shearing or otherwise breaking or deforming the thread form 50. The interaction of the mutilated thread form 50 with the inner surface of the sleeve may also serve to prevent free relative rotation between the two elements upon the association of a threaded member complementary to threaded bore 36a.

Thus it is apparent that there has been provided in accordance with the invention a self-drilling one-piece anchor device that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

We claim:

1. A one-piece bolt anchor device for drilling a blind, non-through bore in a masonry type support surface and anchoring therein without withdrawal of the device from the support surface, comprising an upper sleeve section having a predetermined outer diameter and a bore of predetermined inner diameter, the upper extremity of the sleeve section including surface means for inducing rotation of the device about its longitudinal axis, a lower drill section with a terminal extremity including laterally extending cutting edges at a diameter substantially equal to the predetermined outer diameter of the sleeve section, longitudinally extending material removing flutes intersecting each of the laterally extending cutting edges, a thin, frangible wall section interconnecting the drill section with the sleeve section, the portion of the drill section intermediate the cutting edges and frangible wall section being tapered inwardly providing an area into which the masonry material removed by the cutting edge may be received as well as means to expand the sleeve section when it is driven thereover, the upper sleeve including longitudinally extending grooves from the frangible wall section upwardly to facilitate the removal of masonry material from the bore, a threaded bore extending axially of the drill section, means in the bore for accepting axial forces to effect the drilling of the bore into the masonry surface, wherein the device may drill a bore and be set by impacting the sleeve to fracture the interconnecting wall and expand the sleeve over the drill section.

2. The anchor device of claim 1 wherein the bottommost wall of the sleeve bore forms a radially inwardly extending abutment driving surface to accept impact driving force from a driving tool without subjecting the frangible wall to the impact driving forces, the inner side wall portions of the sleeve bore including surfaces accepting rotary forces from a driving too.

3. The anchor device of claim 1 including a scribe line on the outer surface of the sleeve portion at a predetermined axial location intermediate the extremities of the sleeve portion.

4. The anchor device of claim 1 wherein the tapered portion of the drill section is provided with flute means.

5. The anchor device in accordance with claim 1 wherein the grooves formed in the sleeve's outer surfac are helical beginning at the frangible wall section.

6. The anchor device in accordance with claim 1 wherein a portion of the drill section directly above and adjacent to the cutting edges is generally cylindrical for a short axial distance intermediate the cutting edges and the tapered portion.

* * * * *